US011658537B2

(12) United States Patent
Lee et al.

(10) Patent No.: US 11,658,537 B2
(45) Date of Patent: May 23, 2023

(54) MOTOR AND ELECTRIC PUMP HAVING THE SAME

(71) Applicant: COAVIS, Sejong-si (KR)

(72) Inventors: Hyun Tae Lee, Sejong-si (KR); Gyu Sang Yu, Sejong-si (KR); Woo Keun Lee, Sejong-si (KR)

(73) Assignee: COAVIS, Sejong-si (KR)

( * ) Notice: Subject to any disclaimer, the term of this patent is extended or adjusted under 35 U.S.C. 154(b) by 248 days.

(21) Appl. No.: 17/103,276

(22) Filed: Nov. 24, 2020

(65) Prior Publication Data

US 2021/0175767 A1    Jun. 10, 2021

(30) Foreign Application Priority Data

Dec. 5, 2019    (KR) .................. 10-2019-0160491

(51) Int. Cl.
*F04D 13/06*    (2006.01)
*H02K 3/52*    (2006.01)

(52) U.S. Cl.
CPC ......... *H02K 3/522* (2013.01); *F04D 13/0693* (2013.01); *H02K 2203/09* (2013.01)

(58) Field of Classification Search
CPC .......... H02K 3/52; H02K 3/521; H02K 3/522; H02K 2203/09; F04D 13/064; F04D 13/0686; F04D 13/0693; H01R 9/24; H01R 4/2462; H01R 25/162
See application file for complete search history.

(56) References Cited

U.S. PATENT DOCUMENTS

| 4,287,446 | A  | * | 9/1981  | Lill ..................... H02K 37/00 310/71 |
| 4,689,023 | A  | * | 8/1987  | Strong, III ............ H05K 1/029 439/189 |
| 8,035,263 | B2 | * | 10/2011 | Kienzler ............... H02K 3/522 310/179 |
| 8,466,590 | B2 | * | 6/2013  | Hauser ................. H02K 3/522 310/68 B |
| 10,396,616 | B2 | * | 8/2019  | Beetz .................... H02K 3/522 |
| 2002/0055294 | A1 | * | 5/2002 | Murakami ........... H01R 12/675 439/395 |
| 2005/0116562 | A1 | * | 6/2005 | Schlosser ................ H02K 5/15 29/596 |

(Continued)

FOREIGN PATENT DOCUMENTS

KR    101273665 B1    6/2013

*Primary Examiner* — Thomas Fink
(74) *Attorney, Agent, or Firm* — The Webb Law Firm

(57) ABSTRACT

Provided are a motor and an electric pump having the same, the motor including: a stator having a center made hollow to vertically pass through its opposite surfaces; a rotor which is disposed to be spaced apart from an inner surface of the stator, and into which a drive shaft is inserted to its center; a terminal block including a frame coupled to an upper side of the stator, ribs extending radially inward from the frame, and a ring portion which is coupled to the ribs and into which an upper side of the drive shaft of the rotor is rotatably inserted; and a terminal coupled to the terminal block and electrically connected to the coil of the stator, wherein the terminal may be easily coupled to the coil of the stator included in the motor, and the stator and the rotor may be easily aligned with each other.

8 Claims, 6 Drawing Sheets

(56) References Cited

U.S. PATENT DOCUMENTS

| | | | |
|---|---|---|---|
| 2007/0286723 A1* | 12/2007 | Ihle | F04D 29/5893 |
| | | | 415/206 |
| 2011/0057524 A1* | 3/2011 | Andrieux | H02K 5/225 |
| | | | 310/71 |
| 2011/0068647 A1* | 3/2011 | Sakaue | H02K 3/28 |
| | | | 310/71 |
| 2013/0336817 A1* | 12/2013 | Honda | H02K 3/522 |
| | | | 310/71 |
| 2014/0183993 A1* | 7/2014 | Takasaki | H02K 15/0062 |
| | | | 310/71 |
| 2015/0076943 A1* | 3/2015 | Hamajima | H02K 3/522 |
| | | | 310/71 |
| 2016/0261161 A1* | 9/2016 | Roos | H02K 3/522 |
| 2017/0201143 A1* | 7/2017 | Pae | H02K 5/12 |
| 2018/0305539 A1* | 10/2018 | Koizumi | C08J 5/10 |

* cited by examiner

[FIG. 1]
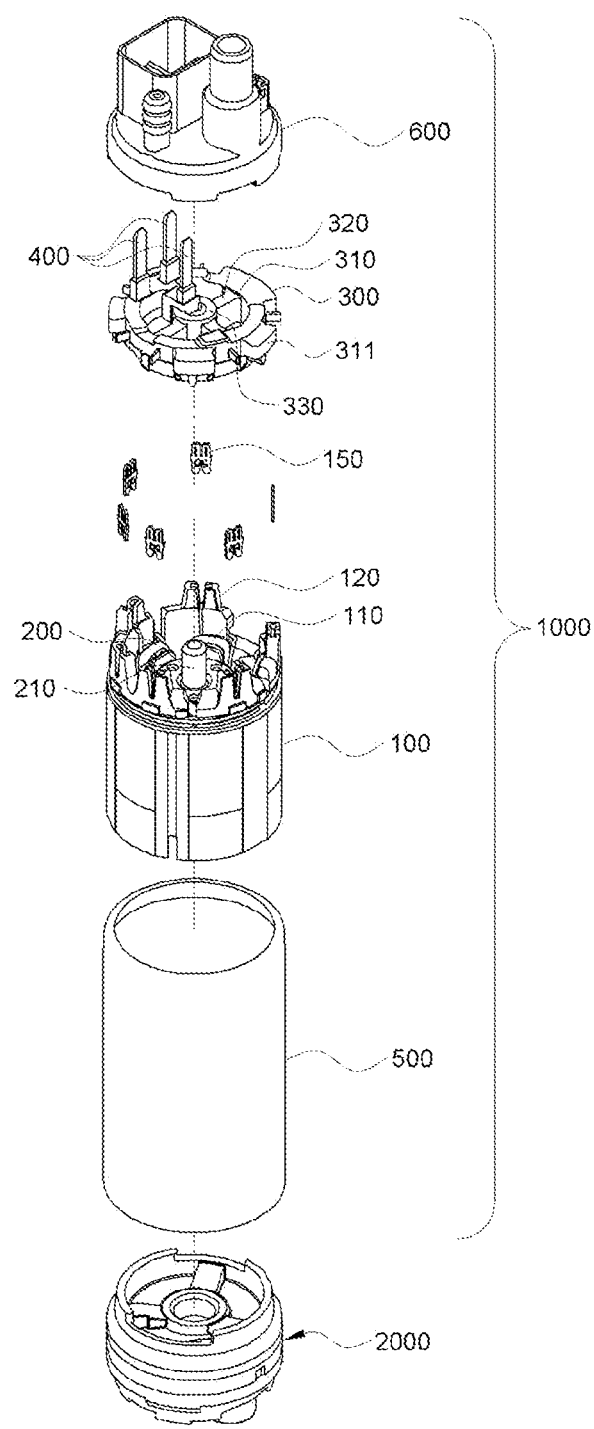

[FIG. 2]
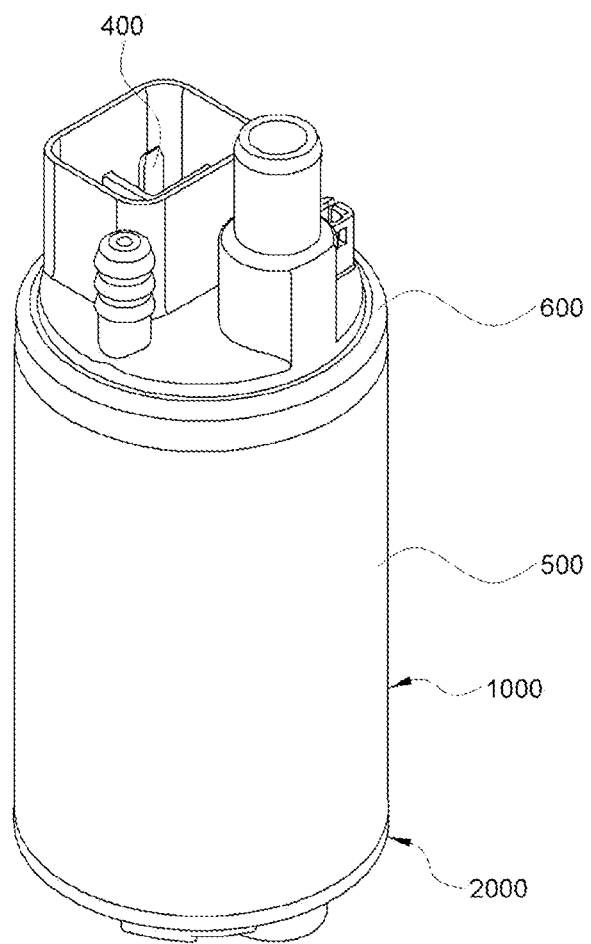

[FIG. 3]
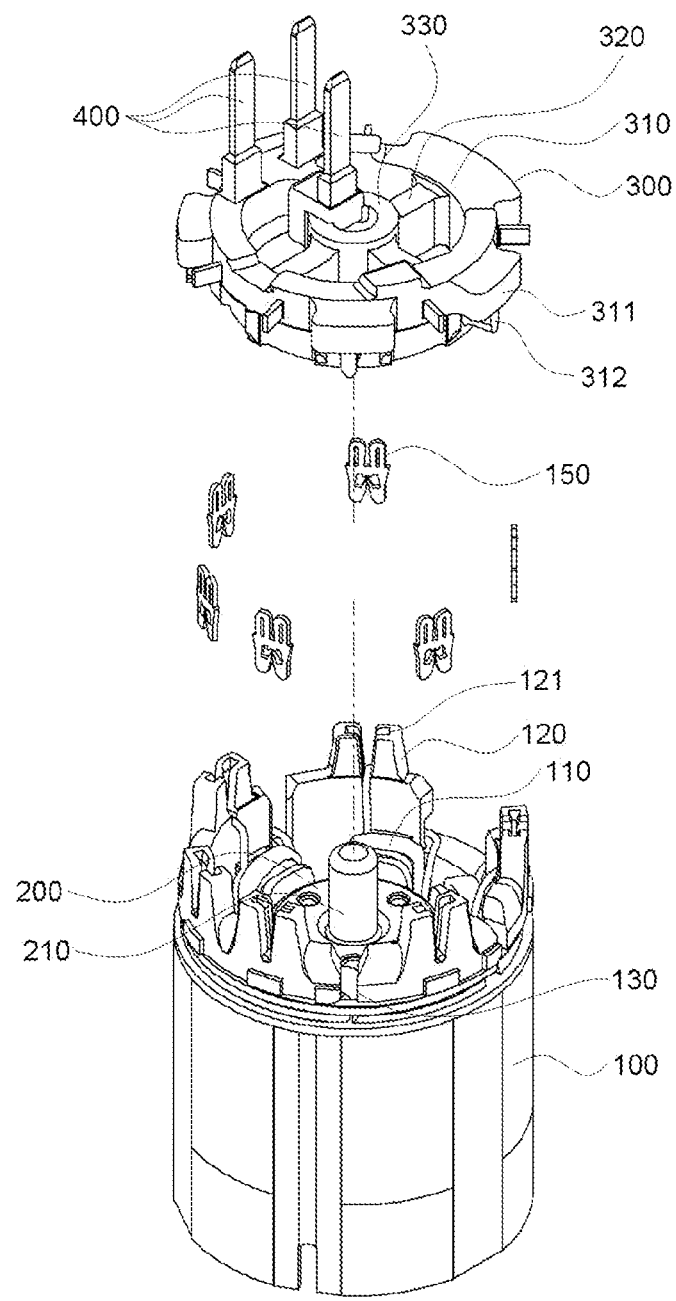

[FIG. 4]
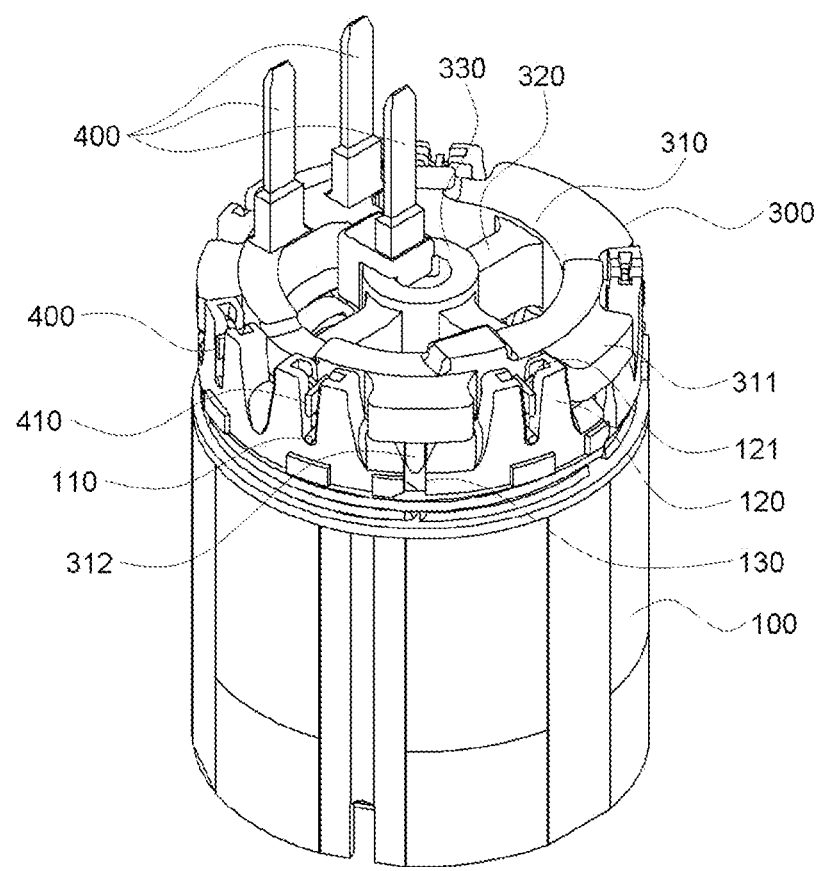

[FIG. 5]
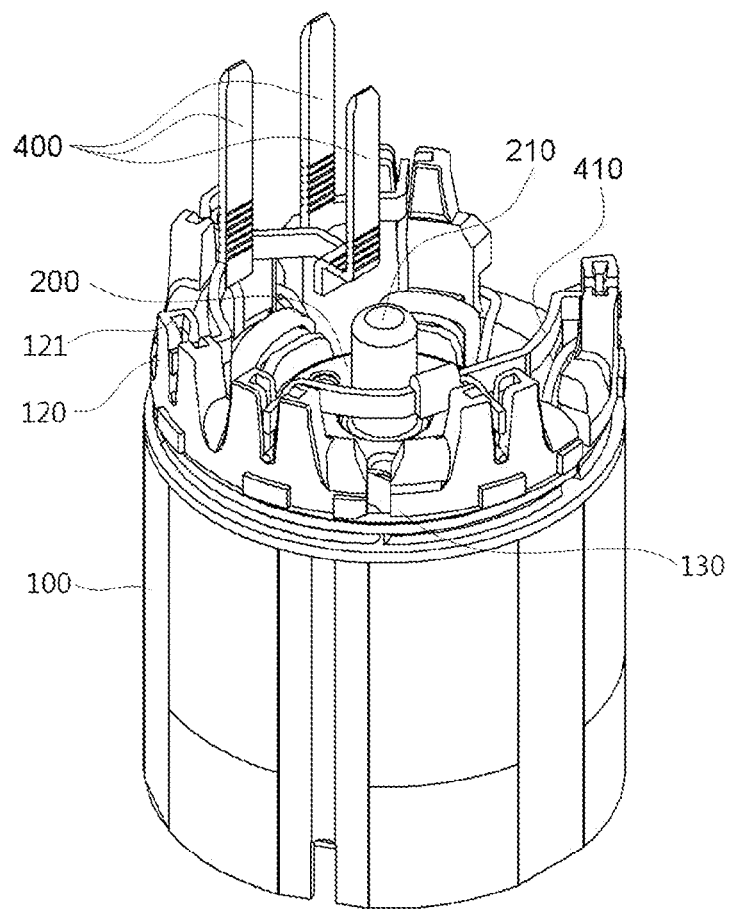
[FIG. 6]
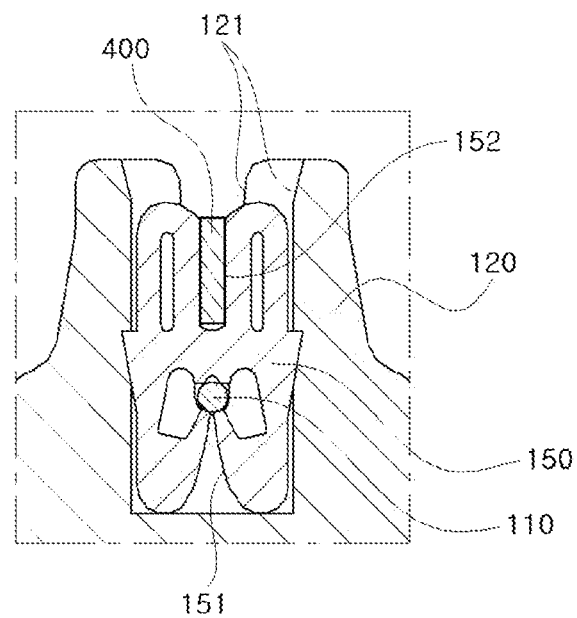

[FIG. 7]
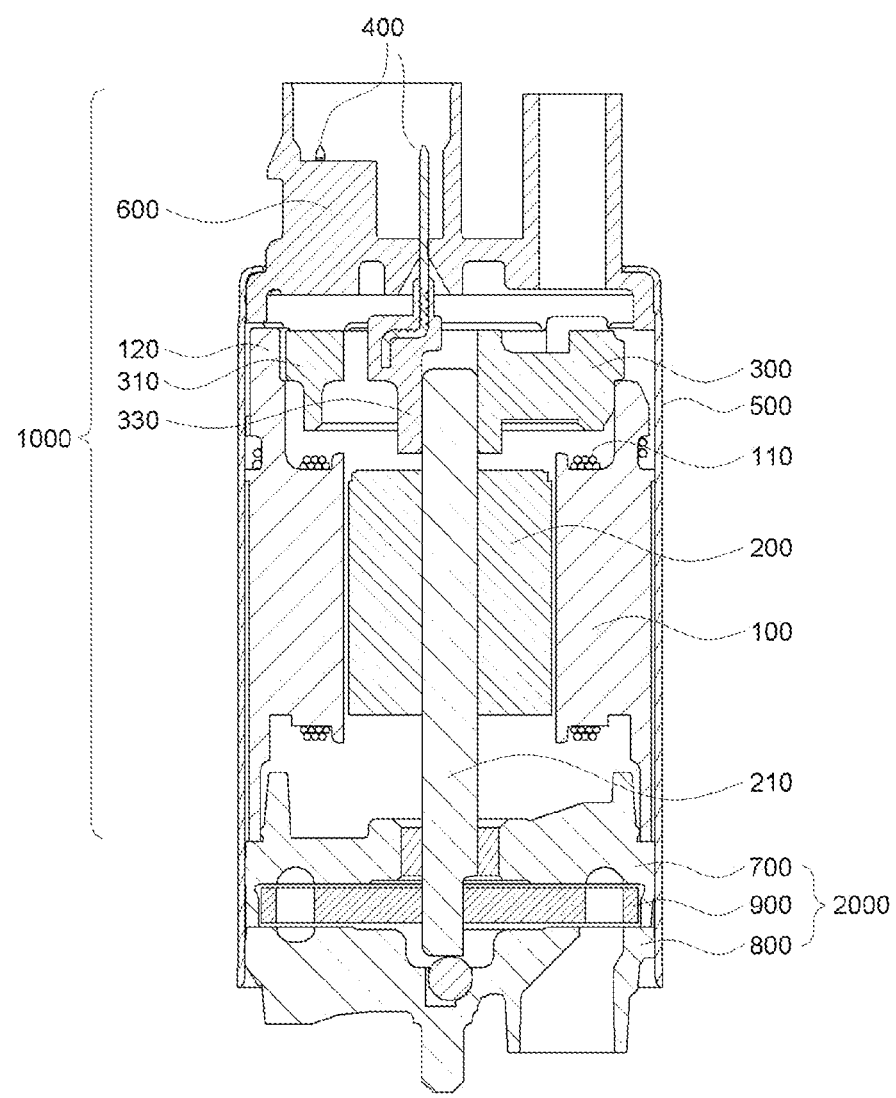

MOTOR AND ELECTRIC PUMP HAVING THE SAME

CROSS-REFERENCE TO RELATED APPLICATION

This application claims priority to Korean Patent Application No. 10-2019-0160491 filed Dec. 5, 2019, the disclosure of which is hereby incorporated by reference in its entirety.

BACKGROUND OF THE INVENTION

Field of the Invention

The following disclosure relates to a motor, in which a terminal may be electrically connected to a coil of a stator and the stator and a rotor may be easily aligned with each other, and an electric pump having the same.

Description of Related Art

A brushless direct current (BLDC) motor is a motor in which a brush and a commutator are removed from the direct current (DC) motor and an electronic commutation member is installed. The BLCD motor may prevent friction and abrasion, which are disadvantages of a conventional DC motor, thereby having a long life and relatively high efficiency.

In general, such a BLDC motor may include a stator having a coil wound therearound and fixed in a housing, and a rotor disposed close to the stator and rotatably coupled to the housing by mounting a permanent magnet thereon. In addition, as the coil wound around the stator is electrically connected with the terminal, the block coupled to the terminal may be disposed on one side of the stator to fix the terminal, and the terminal, the block and the stator may then be molded together and integrally formed with one another. In addition, a shaft support supporting a drive shaft of the rotor, which is inserted thereinto, to be rotatable may be formed on an upper cover coupled to the housing for the alignment of the stator and rotor as the drive shaft of the rotor is rotatably coupled thereto.

Accordingly, in a conventional BLDC motor, the terminal may be manufactured to be fixed in a state of being coupled to the block, and then coupled with the stator through a separate insert injection molding, thereby complicating its process and increasing the manufacturing cost. In addition, the shaft support portion to which the drive shaft of the rotor is coupled may be formed on the upper cover disposed above the block to which the terminal is coupled, and the alignment of the stator and the rotor may thus become unstable.

RELATED ART DOCUMENT

Patent Document

KR 10-1273665 B1 (Jun. 3, 2013)

SUMMARY OF THE INVENTION

An embodiment of the present disclosure is directed to providing a motor, in which a terminal may be easily coupled to and electrically connected to a coil of a stator included in the motor, and the stator and a rotor may be easily aligned with each other, and an electric pump having the same.

In one general aspect, a motor includes: a stator having a plurality of coils wound therearound and a center made hollow to vertically pass through its opposite surfaces; a rotor which is disposed to be spaced apart from an inner surface of the stator, and into which a drive shaft is inserted to vertically pass through its center; a terminal block including a frame coupled to an upper side of the stator, ribs extending radially inward from the frame, and a ring portion which is coupled to the ribs and into which an upper side of the drive shaft of the rotor is rotatably inserted; and a terminal coupled to the terminal block and electrically connected to the coil of the stator.

In addition, the terminal block and the terminal may be integrally formed with each other through insert injection.

In addition, the stator may have a plurality of protrusions protruding upward from its upper surface, the protrusions being formed to be spaced apart from each other in a circumferential direction, the frame of the terminal block may have a stepped jaw protruding radially outward, and the frame of the terminal block may be inserted into the inside of the stator, which is surrounded by the protrusions of the stator, and the stepped jaw of the terminal block may be inserted between the protrusions of the stator.

In addition, the stator may have a coupling groove formed to be concave downward from the upper surface of the stator, the frame of the terminal block may have a fixing protrusion formed to protrude downward, and the fixing protrusion of the terminal block may be inserted into the coupling groove of the stator.

In addition, the protrusions of the stator may each have a concave insertion groove, and the coil and a connection connector may be inserted into the insertion groove to be coupled and electrically connected to each other, and the terminal may have one side extending upward from an upper surface of the terminal block and the other side extending radially outward from an outer circumferential surface of the frame of the terminal block, and the other side of the terminal may be inserted into the connection connector to be coupled and electrically connected to the connection connector.

In addition, the insertion groove each formed in the protrusions of the stator may have a cross-section formed in a shape of "+" when viewed downward from an upper surface of the protrusion, and the insertion groove may have a radially-formed portion penetrating through the opposite surfaces of the protrusions. In addition, the connection connector may have a coil insertion groove formed in its lower side, and the coil may be inserted into the coil insertion groove, and the connection connector may have a terminal insertion groove formed in its upper side, and the terminal may be inserted into the terminal insertion groove.

In addition, the motor may further include: a housing including the stator, the rotor and the terminal block disposed therein, the stator being coupled and fixed to an inner circumferential surface of the housing; and an upper cover coupled to an upper side of the housing, and having a lead hole through which the terminal passes and a fluid discharge port through which a fluid is discharged.

In another general aspect, an electric pump includes: the motor described above; and a pump portion coupled to a lower side of the housing of the motor and connected to the drive shaft of the motor to be rotated, thereby pumping a fluid.

In addition, the pump portion may include: an upper casing having a fluid outlet; a lower casing coupled with the upper casing to have a receiving space formed therein and having a fluid inlet; and an impeller disposed in the receiving space formed by the coupling of the upper casing and the lower casing, and coupled to the drive shaft of the motor.

BRIEF DESCRIPTION OF THE DRAWINGS

FIGS. 1 and 2 are an exploded perspective view and an assembled perspective view each showing a motor according to an embodiment of the present disclosure and an electric pump having the same.

FIGS. 3 and 4 are an exploded perspective view and an assembled perspective view each showing the stator, rotor, terminal block, and terminal portions of a motor according to an embodiment of the present disclosure.

FIG. 5 is an assembled perspective view showing a structure of the terminal in a state in which the terminal block is removed from FIG. 4.

FIG. 6 is a cross-sectional view showing an electrical connection structure between the coil and terminal of a motor according to an embodiment of the present disclosure.

FIG. 7 is a front cross-sectional view showing a motor according to an embodiment of the present disclosure and an electric pump having the same.

DESCRIPTION OF THE INVENTION

Hereinafter, a motor according to the present disclosure and an electric pump having the same are described in detail with reference to the accompanying drawings.

FIGS. 1 and 2 are an exploded perspective view and an assembled perspective view each showing a motor according to an embodiment of the present disclosure and an electric pump having the same; FIGS. 3 and 4 are an exploded perspective view and an assembled perspective view each showing the stator, rotor, terminal block, and terminal portions of a motor according to an embodiment of the present disclosure; and FIG. 5 is an assembled perspective view showing a structure of the terminal in a state in which the terminal block is removed from FIG. 4.

As shown in the drawings, the electric pump according to an embodiment of the present disclosure may roughly include a motor 1000 and a pump portion 2000.

Here, the motor 1000 may be a brushless direct current (BLDC) motor, and the motor 1000 may include: a stator 100; a rotor 200; a terminal block 300; and a plurality of terminals 400, and may further include: a housing 500 and an upper cover 600.

The stator 100 may be formed in a shape in which its center is made hollow to vertically pass through its opposite surfaces, and coils 110 may be wound around a plurality of teeth protruding inward from its core formed in a cylindrical shape. Here, in a state in which an insulator made of an electrically insulating material is coupled to the stator 100 to surround the core and the teeth, the coil 110 may be wound around the outside of the insulator.

The rotor 200 may be formed in a shape in which a drive shaft 210 is inserted to vertically pass through the center of its cylindrical-shaped core, and the drive shaft 210 may be formed to extend upward from an upper end of the core and downward from a lower end of the core. The rotor 200 may be inserted into the stator 100 in such a manner that its core portion is disposed to be spaced apart from an inner surface of the stator 100 by a predetermined distance.

The terminal block 300 may have a frame 310 formed in a substantially ring shape in its circumferential direction, a ring portion 330 formed in a shape of a ring having a vertical through-hole and disposed in the inner center of the frame 310, and a plurality of ribs 320 formed radially to connect the frame 310 with the ring portion 330. Here, the ribs 320 may be arranged to be spaced apart from each other in the circumferential direction. In addition, the frame 310 of the terminal block 300 may be inserted into and coupled to an upper end portion of the stator 100, and an upper end portion of the drive shaft 210 of the rotor 200 may be inserted into and rotatably supported by the ring portion 330. In addition, when the upper end portion of the drive shaft 210 of the rotor 200 is inserted into the ring portion 330, the depth at which the drive shaft 210 is inserted into the ring portion 330 may be limited due to a locking jaw which is formed at an upper end of the ring portion 330 to protrude radially inward from an inner circumferential surface of the ring portion 330.

The plurality of terminals 400 may be formed, and for example, three terminals 400 may be formed to form three phases (u, v and w). In addition, the terminals 400 may be electrically connected to coils of the phases different from each other, respectively. In addition, the terminals 400 may include bus bars 410 each forming a neutral point, and the bus bars 410 may be connected to all of the coils forming the three phases for the three phases to be connected to each other. Here, the terminals 400 and the bus bars 410 may be integrally formed with the terminal block 300 by insert injection. That is, the terminals 400, the bus bars 410 and the terminal block 300 may be formed to be an integral assembly by putting the terminals 400 and the bus bars 410, which are metal materials, into a mold and then injecting a resin into the mold.

Here, the stator 100 may have a plurality of protrusions 120 protruding upward from its upper surface, the protrusions 120 being formed to be spaced apart from each other in the circumferential direction. In addition, the frame 310 of the terminal block 300 may have a plurality of stepped jaws 311 each protruding radially outward from its outer circumferential surface. Therefore, the frame 310 of the terminal block 300 may be inserted into the inside of the stator 100, which is surrounded by the protrusions 120 of the stator 100, and the stepped jaws 311 of the terminal block 300 may be inserted between the protrusions 120 of the stator 100, respectively. Accordingly, the terminal block 300 may be firmly coupled to the stator 100, and the depth at which the terminal block 300 is inserted into the stator 100 may be limited.

In addition, the stator 100 may have a coupling groove 130 formed at a position between the protrusions 120 to be concave downward from the upper surface of the stator 100, and the frame 310 of the terminal block 300 may have a fixing protrusion 312 formed under the stepped jaws 311 to protrude radially outward from the outer circumferential surface of the frame 310. Accordingly, the fixing protrusion 312 of the terminal block 300 may be inserted into and more firmly coupled to the coupling groove 130 of the stator 100. Here, the coupling groove 130 formed in the stator 100 may have a depth deeper than the height of the fixing protrusion 312 of the terminal block 300 in the vertical direction, and the winding of the coil 110 may thus be drawn in and out through the coupling groove 130 to connect the coils 110 of the stator 100 to each other.

In addition, the protrusions 120 of the stator 100 may each have an insertion groove 121 formed in its upper surface to be concave downward, and one end portion of the coil 110 may be inserted into the insertion groove 121. In this state, a connection connector 150 may be inserted into the insertion groove 121 for the coil 110 and a lower side of the connection connector 150 to be coupled and electrically connected to each other. In addition, the terminals 400 may each be formed to have one side extending upward from the upper surface of the frame 310 or that of the ring portion 330 of the terminal block 300, and the other side extending radially outward from the outer circumferential surface of the frame 310 of the terminal block 300. Therefore, when the terminal block 300 is inserted into and connected to the stator 100, the other side of each of the terminals 400 may be inserted into an upper side of the connection connector 150 for the connection connector 150 and the terminal 400 to be coupled and electrically connected to each other. Accordingly, the coils 110 of the stator 100 and the three-phase terminals 400 may be easily electrically connected to each other by simply assembling the terminal block to the stator without a separate soldering process or the like.

Referring to FIGS. 5 and 6, the insertion groove 121 each formed in the protrusions 120 of the stator 100 may have a cross-section formed in a shape of "+" when viewed downward from an upper surface of the protrusions 120, and the insertion groove 121 may have a radially-formed portion penetrating through the opposite surfaces of the protrusions 120, i.e. its inner and outer circumferential surfaces. Therefore, the end of the coils 110 may be inserted into the radially-formed portion of the insertion groove 121 and the connection connector 150 may be inserted into a portion formed to be perpendicular to a radial direction of the insertion groove 121. Accordingly, the coil 110 may be inserted into and coupled to the coil insertion groove 151 formed in the lower side of the connection connector 150. In addition, the terminal 400 may be inserted into the radially-formed portion of the insertion groove 121, and thus be inserted into and coupled to a terminal insertion groove 152 formed in the upper side of the connection connector 150.

The housing 500 may be formed to have a hollow inner portion and its opposite ends vertically open, and thus be formed in a shape of a tube having its inner and outer portions communicating with each other. In addition, the stator 100 and the terminal block 300 may be disposed in the housing 500, and the stator 100 may be coupled and fixed to an inner wall of the housing 500. In addition, the upper cover 600 may be coupled to an open upper side of the housing 500, and the upper cover 600 may be coupled to block the open upper side of the housing 500. In addition, the upper cover 600 may have a fluid discharge port vertically penetrating through the upper cover 600 and a lead hole through which the terminal 400 passes, and an upper end portion of the terminal 400 may be exposed to the outside of the upper cover 600.

Therefore, in the motor of the present disclosure, the terminal block may be coupled with the stator after the terminal is coupled to the terminal block. Accordingly, the terminal may thus be easily electrically connected to the coil of the stator, and the terminal may be easily coupled to the stator. In addition, the drive shaft of the rotor may be rotatably supported using the terminal block coupled to the stator, thereby improving the alignment of the stator and rotor.

In addition, the electric pump having the motor of the present disclosure as shown in FIG. 7 may be configured to include: the motor 1000 described above; and the pump portion 2000 coupled to a lower side of the housing 500 of the motor 1000, in which the pump portion 2000 may include an upper casing 700, a lower casing 800 and an impeller 900.

The upper casing 700 may have a fluid outlet vertically passing through its opposite surfaces, the lower casing 800 may have a fluid inlet vertically passing through its opposite surfaces, and an impeller 900 may be disposed in a receiving space inside the upper and lower casings, which is formed by the coupling of the upper casing 700 and the lower casing 800. In addition, the upper casing 700 and lower casing 800 may be coupled and fixed to the lower side of the housing 500. In addition, the drive shaft 210 of the motor 1000 may have its lower end portion penetrating through the upper casing 700 and then coupled to the impeller 900, and the impeller 900 may be configured to be rotated together with the drive shaft 210 of the motor 1000. Therefore, when the motor is operated, the impeller 900 may be rotated. Accordingly, the fluid may be introduced through the fluid inlet, may have increased pressure while passing through the impeller 900, and may then be discharged to the fluid outlet of the upper casing 700. In addition, the fluid discharged from the pump portion 2000 may flow upward along a space between the stator 100 and rotor 200 of the motor 1000, may pass through a flow path, which is a space between the ribs 320 formed in the terminal block 300, and may then be discharged to the outside through the fluid discharge port formed on the upper cover 600.

The present disclosure may provide the motor, in which a terminal is easily coupled to and electrically connected to the coil of the stator included in the motor, and the stator and the rotor are easily aligned with each other, and the electric pump having the same.

The present disclosure is not limited to the above-mentioned embodiments, but may be variously applied. In addition, the present disclosure may be variously modified by those skilled in the art to which the present disclosure pertains without departing from the gist of the present disclosure claimed in the claims.

DETAILED DESCRIPTION OF MAIN ELEMENTS

100: stator
110: coil
120: protrusion
121: insertion groove
130: coupling groove
150: connection connector
151: coil insertion groove
152: terminal insertion groove
200: rotor
210: drive shaft
300: terminal block
310: frame
311: stepped jaw
312: fixing protrusion
320: rib
330: ring portion
400: terminal
410: bus bar
500: housing
600: upper cover
700: upper casing
800: lower casing
900: impeller
1000: motor
2000: pump portion

What is claimed is:
1. A motor comprising:
a stator having a plurality of coils wound therearound and a center made hollow to vertically pass through its center;
a rotor which is disposed to be spaced apart from an inner surface of the stator, and into which a drive shaft is inserted to vertically pass through its center;

a terminal block including a frame coupled to an upper side of the stator, ribs extending radially inward from the frame, and a ring portion which is coupled to the ribs and into which an upper side of the drive shaft of the rotor is rotatably inserted; and a terminal coupled to the terminal block and electrically connected to the coil of the stator, wherein the stator has a plurality of protrusions protruding upward from its upper surface, the protrusions being formed to be spaced apart from each other in a circumferential direction, the frame of the terminal block has a stepped jaw protruding radially outward, and the frame of the terminal block is inserted into the inside of the stator, which is surrounded by the protrusions of the stator, and the stepped jaw of the terminal block is inserted between the protrusions of the stator, wherein the protrusions of the stator each have a concave insertion groove, and the coil and a connection connector are inserted into the insertion groove to be coupled and electrically connected to each other, and the terminal has one side extending upward from an upper surface of the terminal block and the other side extending radially outward from an outer circumferential surface of the frame of the terminal block, and the other side of the terminal is inserted into the connection connector to be coupled and electrically connected to the connection connector.

2. The motor of claim 1, wherein the terminal block and the terminal are integrally formed with each other through insert molding.

3. The motor of claim 1, wherein the stator has a coupling groove formed to be concave downward from the upper surface of the stator, the frame of the terminal block has a fixing protrusion formed to protrude downward, and the fixing protrusion of the terminal block is inserted into the coupling groove of the stator.

4. The motor of claim 1, wherein the insertion groove each formed in the protrusions of the stator has a cross-section formed in a shape of "+" when viewed downward from an upper surface of the protrusion, and the insertion groove has a radially-formed portion penetrating through the opposite surfaces of the protrusions.

5. The motor of claim 4, wherein the connection connector has a coil insertion groove formed in its lower side, and the coil is inserted into the coil insertion groove, and the connection connector has a terminal insertion groove formed in its upper side, and the terminal is inserted into the terminal insertion groove.

6. The motor of claim 1, further comprising:

a housing including the stator, the rotor and the terminal block disposed therein, the stator being coupled and fixed to an inner circumferential surface of the housing; and an upper cover coupled to an upper side of the housing, and having a lead hole through which the terminal passes and a fluid discharge port through which a fluid is discharged.

7. An electric pump comprising:

the motor of claim 6; and a pump portion coupled to a lower side of the housing of the motor and connected to the drive shaft of the motor to be rotated, thereby pumping a fluid.

8. The electric pump of claim 7, wherein the pump portion includes:

an upper casing having a fluid outlet;

a lower casing coupled with the upper casing to have a receiving space formed therein and having a fluid inlet; and an impeller disposed in the receiving space formed by the coupling of the upper casing and the lower casing, and coupled to the drive shaft of the motor.

* * * * *